(12) United States Patent
Christensen

(10) Patent No.: US 8,436,486 B2
(45) Date of Patent: May 7, 2013

(54) POWER TRAIN FOR A WIND TURBINE

(75) Inventor: Mogens Christensen, Silkeborg (DK)

(73) Assignee: Gamesa Innovation & Technology, S.L., Sarriguren (ES)

( * ) Notice: Subject to any disclaimer, the term of this patent is extended or adjusted under 35 U.S.C. 154(b) by 339 days.

(21) Appl. No.: 12/739,508

(22) PCT Filed: Oct. 27, 2008

(86) PCT No.: PCT/ES2008/070197
§ 371 (c)(1),
(2), (4) Date: Apr. 23, 2010

(87) PCT Pub. No.: WO2009/056664
PCT Pub. Date: May 7, 2009

(65) Prior Publication Data
US 2010/0314882 A1 Dec. 16, 2010

(30) Foreign Application Priority Data

Oct. 29, 2007 (ES) .................................. 200702845

(51) Int. Cl.
*F03D 9/00* (2006.01)
(52) U.S. Cl.
USPC .......................................................... 290/55
(58) Field of Classification Search ............... 290/55, 290/44
See application file for complete search history.

(56) References Cited

U.S. PATENT DOCUMENTS

| 2,701,526 | A | * | 2/1955 | Rotkin | 102/208 |
| 6,781,276 | B1 | * | 8/2004 | Stiesdal et al. | 310/254.1 |
| 6,911,741 | B2 | * | 6/2005 | Pettersen et al. | 290/44 |
| 7,360,310 | B2 | * | 4/2008 | Bagepalli et al. | 29/898.08 |
| 8,274,191 | B2 | * | 9/2012 | Stiesdal | 310/216.113 |
| 8,334,613 | B2 | * | 12/2012 | Numajiri | 290/55 |
| 2006/0104815 | A1 | * | 5/2006 | Siegfriedsen | 416/170 R |
| 2009/0015020 | A1 | * | 1/2009 | Stiesdal | 290/55 |

FOREIGN PATENT DOCUMENTS

| ES | 2 277 795 A1 | 7/2007 |
| WO | 01/94779 A1 | 12/2001 |
| WO | 02/33254 A1 | 4/2002 |

* cited by examiner

*Primary Examiner* — Tulsidas C Patel
*Assistant Examiner* — Viet Nguyen
(74) *Attorney, Agent, or Firm* — Ladas & Parry LLP

(57) ABSTRACT

Wind power turbine comprising a tower (11), a supporting frame (41) and a drive train including a rotor hub (13), a main shaft (21) supported by a front bearing (43) and a rear bearing (45), a generator (31), located at an opposite side to the rotor hub (13) with respect to the tower (11), with a generator shaft (23) rigidly connected to the main shaft (21), and a coupling element (39) between the generator housing (33) and the supporting frame (41) which is placed in a plane substantially coincident with a perpendicular plane (Y-Z) to the main shaft (21) axis (X) in the center of the rear bearing (43) and it is made so that it allows displacements of the generator housing (33) in the direction of the main shaft (21) axis (X) but blocks turning displacements of the generator housing (33) with respect to the main shaft (21) axis (X).

5 Claims, 1 Drawing Sheet

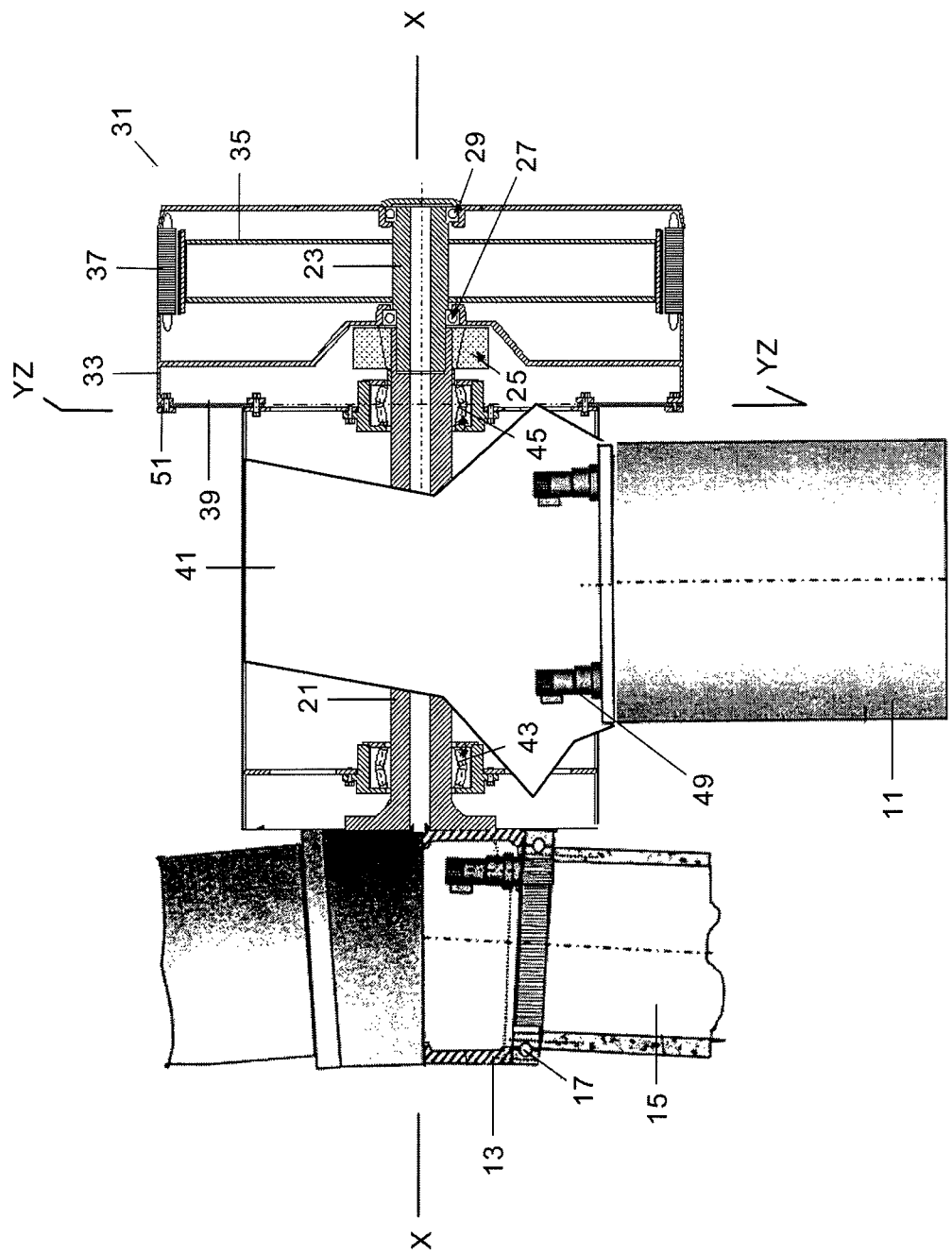

POWER TRAIN FOR A WIND TURBINE

FIELD OF THE INVENTION

This invention relates to a wind turbine and in particular to the drive train configuration of a gearless wind turbine that uses a generator directly driven by a main shaft.

BACKGROUND

Drive train configurations for wind turbines with and without gearbox are well known in the art.

In the first case the gearbox and the generator can be arranged successively as individual components or arranged in a single unit. One example of the latter case is disclosed in U.S. 2006/0104815 A1 in which the generator is constructed as a ring concentrically embracing the gear being both elements axially dismountable and connected in an individually detachable manner to a machine support.

In the second case, particularly in the case of wind turbines having a permanent magnet generator that is directly driven by a connecting arrangement between the rotor hub and the generator, there are known different drive train configurations.

In one of these configurations disclosed in WO 01/94779 A1 the connecting arrangement between the rotor hub and the generator is a two-part axle supported by two bearing units.

In another of these configurations the connecting arrangement between the rotor hub and the generator is a hollow shaft supported by bearings on a tube member (interior to the hollow shaft) attached to the supporting frame of the wind turbine. In these configurations, the wind turbine supporting frame mounted over the tower is designed to permit that the generator unit—having a large-diameter rotor and stator—could be located between the rotor hub and the tower. One example of these configurations is described in U.S. 2004/0108733 A1 in which the hollow shaft is supported by means of a single bearing which also carries moments on the tube member. This configuration is intended to reduce the size and the weight of the elements of the wind turbine which are to be mounted at the top of the tower but has the drawback of a costly maintenance in particular when the dismounting of components is needed.

In another of these configurations, the tower is located between the rotor hub and the generator unit. One example of these configurations is described in WO 02/33254 A1 in which the connecting arrangement between the rotor hub and the generator is a main shaft supported by means of two bearings arranged on a base at the top of the tower.

A problem involved in direct driven drive trains, specially when the tower is located between the rotor hub and the generator unit and consequently requires a long main shaft, is avoiding damaging deformations in the generator unit, when the main shaft bends under high rotor hub loads.

WO 02/033254 addresses that problem by means of a non-rotatable coupling between the generator stator and the wind turbine base. However, this solution involves high bearing loads.

This invention is intended to avoid that drawback.

SUMMARY OF THE INVENTION

It is an object of the present invention to provide a gearless wind turbine that uses a generator having a power larger than 500 kW directly driven by a main shaft with a drive train configuration intended to facilitate its mounting and maintenance.

Another object of the present invention is to provide a gearless wind turbine that uses a generator having a power larger that 500 kW directly driven by a main shaft having a drive train configuration intended to minimize the generator unit deformations and the bearing loads when the main shaft bends under high rotor hub loads.

These and other objects of the present invention are met by providing a wind power turbine comprising:

A tower.

A supporting frame mounted on top of the tower.

A drive train including a rotor hub, a main shaft and a generator with a generator shaft rigidly connected to the main shaft, wherein the rotor hub and the generator are located at opposite sides with respect to the tower, the main shaft is supported by the supporting frame by means of a front bearing close to the rotor hub and a rear bearing close to the generator; the stator, rigidly attached to the generator housing, is supported by the generator shaft by means of two bearings; the drive train also comprising a coupling element between the generator housing and the supporting frame which is placed in a plane substantially coincident with a perpendicular plane Y-Z to the main shaft axis X in the center of the rear bearing and it is made so that it allows displacements of the generator housing in the direction of the main shaft axis X but blocks turning displacements of the generator housing with respect to the main shaft axis X.

In a preferred embodiment said coupling element is a metal plate. Hereby a simplified flexible coupling between the generator and the supporting frame is achieved.

In a preferred embodiment the generator is a permanent magnet generator. Hereby the use of this type of generators in wind turbines is facilitated.

Other features and advantages of the present invention will be understood from the following detailed description of an illustrative and by no means limiting embodiment of its object in relation with the enclosed drawing.

BRIEF DESCRIPTION OF DRAWINGS

FIG. 1 is a partial section side view of a wind turbine according to this invention.

DETAILED DESCRIPTION OF PREFERRED EMBODIMENTS

The configuration of the drive train of a gearless wind turbine that uses a low-speed permanent magnet (PM) generator directly driven by a main shaft is dependant on the specific features of this type of generators.

The configuration of the drive train according to a preferred embodiment of this invention is based on a main shaft 21 extending from the rotor hub 13 to a PM generator 31, having a power larger than 500 kW, across the tower 11.

The drive train comprises a rotating rotor hub 13 to which one or more blades 15 are attached by means of blade bearings 17, a main shaft 21 and a PM generator 31 comprising a rotor 35 and a stator 37 inside a housing 33.

The main shaft 21 is connected to the rotor hub 13 and to a generator shaft 23 for performing a direct transfer of the driving torque to the generator rotor 35. The connection between the main shaft 21 and the generator shaft 23 is done by means of a shrink disc 25 making the connection stiff in bending and torsion.

The main shaft 21 is supported by the supporting frame 41 mounted on top of the tower 11 by means of a front bearing 43 close to the rotor hub 13 and a rear bearing 45 close to the generator 31. The generator 31 is supported by the generator shaft 23 by means of bearings 27, 29.

The supporting frame 41 is mounted on top of the tower 11 between the rotor hub 13 and the generator 31 together with the interfaces for yaw drives 49 and yaw bearings (not shown).

For balancing the torque output of the generator 31, the generator housing 33, to which the stator 37 is rigidly attached, is coupled with the supporting frame 41, by means of a coupling element 39 located in a plane substantially coincident with a perpendicular plane Y-Z to the main shaft 21 axis X in the center of the rear bearing 45.

When the main shaft 21 is loaded with forces and moments from the rotor hub 13 it will bend, and any point of the generator 31 will displace in a circular path centered in the rear bearing 45 center. As the coupling element 39 is located in the same plane than the rear bearing 45 then the outer edge 51 of the coupling element 39 has to move mainly in the direction of the main shaft axis X to eliminate extreme reaction forces in the generator bearings 27, 29.

The coupling element 39 shall be a stiff element in the Y-Z plane and a flexible element in the X direction. In the Y-Z plane the coupling element 39 must be stiff enough to transfer the torque from generator housing 33 to the supporting frame 41. It must not fold or obtain any permanent deformation.

In a preferred embodiment, the coupling element 39 is a metal plate.

The connection of the coupling element 39 to the generator housing 33 can be bolted welded or other. The connection of the coupling element 39 to the supporting frame 41 could preferably be bolted. It is essential that both connections are stiff without moving parts, that otherwise could be exposed to wear.

The basic function of the coupling element 39 is thus to be able to transfer a very large torque and at the same time allow for axial movements (as a result of shaft rotation in the rear main bearing 45) of the coupling element 39 in order to minimized bearing loads in generator bearings 27, 29 as well as in main bearings 43, 45.

One important advantage of the drive train configuration according to this invention is that it allows a good serviceability of the wind turbine components that can be easily removed from the main shaft without disturbing other components.

Although the present invention has been fully described in connection with preferred embodiments, it is evident that modifications may be introduced within the scope thereof, not considering this as limited by these embodiments, but by the contents of the following claims.

The invention claimed is:

1. A gearless wind power turbine comprising a drive train including a rotor hub carrying rotor blades, a main shaft, and a generator having a power larger than 500 kW with a generator housing a stator and a generator shaft rigidly connected to the main shaft, the main shaft having a main shaft axis, a tower, and a supporting frame mounted on the tower,
    a) the rotor hub and the generator being located on opposite sides with respect to the tower;
    b) the main shaft being supported by the supporting frame by means of a front bearing close to the rotor hub and a rear bearing close to the generator;
    c) the stator, being rigidly attached to the generator housing,
        the gearless wind power turbine also comprising a coupling element between the generator housing and the supporting frame;
        the coupling element being placed in a plane substantially coincident with a perpendicular plane to the main shaft axis in the center of the rear bearing and made so that it blocks turning displacements of the generator housing with respect to the main shaft axis,
        the coupling element being stiff in said perpendicular plane, wherein
        the stator is supported by the generator shaft by means of two bearings; and the coupling element is a flexible in the direction of the main shaft axis to allow the displacements of the generator housing in the direction of the main shaft axis.

2. The gearless wind power turbine according to claim 1, wherein the coupling element is a metal plate.

3. The gearless wind power turbine according to claim 1, wherein the coupling element is attached to the supporting frame and to the generator housing with stiff attachment means.

4. The gearless wind power turbine according to claim 3, wherein the attachment means to the supporting frame are bolts.

5. The gearless wind power turbine according to claim 1, wherein the generator is a permanent magnet generator.

* * * * *